May 10, 1932.  H. H. RUBERT  1,857,334
OIL GAUGE
Filed Aug. 31, 1929
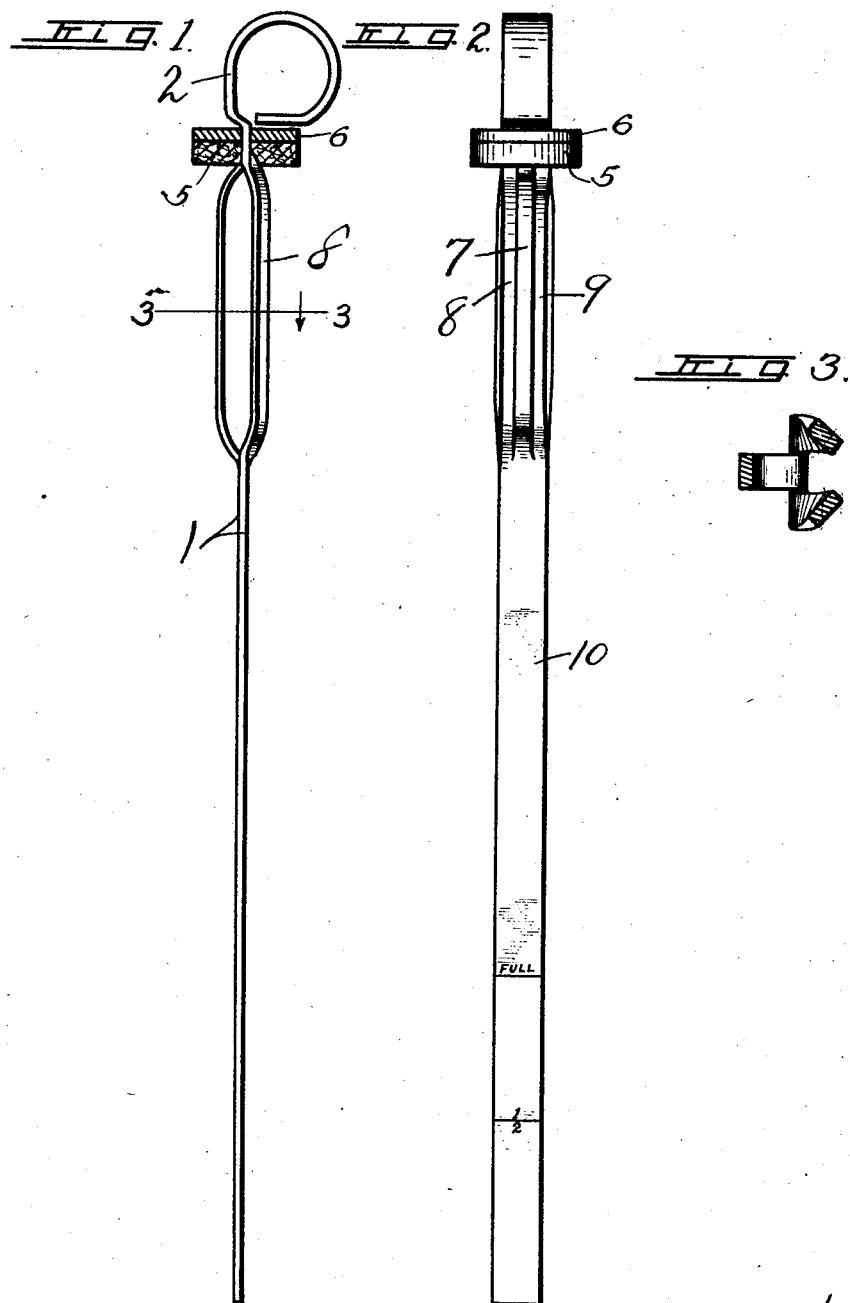

Patented May 10, 1932

1,857,334

UNITED STATES PATENT OFFICE

HAROLD H. RUBERT, OF DETROIT, MICHIGAN, ASSIGNOR, BY MESNE ASSIGNMENTS, TO GENERAL MOTORS CORPORATION, OF DETROIT, MICHIGAN, A CORPORATION OF DELAWARE

OIL GAUGE

Application filed August 31, 1929. Serial No. 389,787.

This invention relates to a new and improved oil gauge and is an improvement upon certain structures disclosed in my co-pending application Serial No. 341,539 filed February 20, 1929, upon Oil gauge.

The main object of this invention is to provide an oil gauge shaped more or less in the form of a rod and in which the rod itself is so formed as to provide a means which will permit the easy withdrawal of the rod from the opening leading to the crank case and the easy insertion of the same therein but which at the time will insure that the rod will be held firmly in position when it is in place due to a three point bearing, the general outline of which conforms to the interior of the opening in the crank case.

Other objects and advantages relate to the details of the structure and the form thereof, all as will more fully appear from the following description taken in connection with the accompanying drawings in which:

Figure 1 is a side elevation of an oil gauge of this invention.

Figure 2 is a front elevation of the same.

Figure 3 is a section on line 3—3, Figure 1.

The oil gauge, as here shown, is formed of a single strip of sheet metal —1—, and the upper end is bent into substantially circular form to provide a finger hold —2—. Just below the finger hold or grip —2—, there is positioned upon the rod —1— a felt washer —5— on the upper surface of which there rests a metal washer —6— to maintain and support the felt plug which is adapted to close and seal the opening leading to the crank case through which the rod —1— extends.

The rod —1— may be of any desired length and provided with any indicia for indicating the level of the oil in the crank case.

In order to form a section of this rod so that it will tightly grip the interior surface of the tube or conduit leading to the crank case, a portion of the length of the rod —1— just below the washer —5— is divided into three longitudinally extending sections, —7—, —8— and —9—, separated by two spaced longitudinally extending slits through the metal of the rod —1—.

The two outside sections —8— and —9— are then deflected or offset to one side of the plane of the gauge-portion —10— of the rod and the intermediate section —7— is deflected or offset to the opposite side of the plane of portion —10— to produce three spaced bearings for the rod within the conduit.

The essential feature of this invention, as distinguished from the disclosure of my prior application, consists in the fact that, during deflection of sections —8— and —9— or at some desired period, the sections are turned or bent, as shown perhaps best in Figure 3 at an angle of approximately 45 degrees to the plane of the portion —10— at the point indicated by the line 3—3, Figure 1. In this manner at the line 3—3, the general outline of the three sections is made to conform substantially to the inner circumference of the tube through which the rod extends into the crank case. By this angular disposition, a three point resilient bearing is formed which is more effective in holding the rod firmly within the tube or conduit in that, as before suggested, the three areas of bearing on the interior of the tube conform substantially to the interior circumference of the tube.

Although I have shown and described a specific form of gauge and a particular angular disposition of the bearing portions thereof, I do not desire to restrict myself to the form of the gauge or to the number of sections into which it may be separated to form a bearing, the esesntial feature of this invention residing in the fact that the general outline of the bearing sections conforms generally with the interior of the tube within which it is designed to be positioned.

I claim:—

1. An oil gauge comprising an elongated strip of material having a limited portion thereof divided longitudinally into a plurality of sections deflected with respect to the undivided portion of the strip and turned at an angle with respect to the plane of the strip so as to conform substantially to the inner circumference of a tube.

2. An oil gauge comprising an elongated metallic strip having a portion thereof divided into three longitudinally extending sections, the intermediate section being deflected to one side of the undivided portion of the strip and the two outside sections being deflected to the opposite side of the undivided portion of the strip and turned at an angle with respect to the plane of the strip.

3. An oil gauge having a resilient bearing portion comprising three strips separated from each other intermediate their ends and having their bearing surfaces conforming substantially to the interior circumference of a tube, said strips being integrally connected at their ends.

4. An oil gauge comprising an elongated metallic strip having a portion thereof divided into three longitudinally extending sections, the intermediate section being deflected to one side of the undivided portion of the strip and the two outside sections being deflected to the opposite side of the undivided portion of the strip, the adjacent edges of such outside sections being turned outwardly to bring such sections to an angle of approximately 45° with respect to the plane of the strip.

In witness whereof I have hereunto set my hand this 12th day of August, 1929.

HAROLD H. RUBERT.